United States Patent [19]
Cunningham et al.

[11] 4,065,002
[45] Dec. 27, 1977

[54] POCKET DOOR SHIP LOADER

[75] Inventors: James Thomas Cunningham, Caldwell; Frederick Orren Snow, III, Wayne; Joseph Richard April, Wallington; A. Tobey Yu, Kinnelon, all of N.J.

[73] Assignee: Orba Corporation, Fairfield, N.J.

[21] Appl. No.: 679,330

[22] Filed: Apr. 22, 1976

[51] Int. Cl.² .......................................... B63B 27/10
[52] U.S. Cl. ................................... 214/14; 198/366; 198/369
[58] Field of Search .............. 198/532, 560, 594, 595, 198/812, 585, 750, 366, 369; 214/14, 15 R

[56] References Cited
U.S. PATENT DOCUMENTS

| 1,327,327 | 1/1920 | Hulett et al. | 214/14 |
| 2,576,217 | 11/1951 | Eggleston | 198/812 X |
| 3,052,364 | 9/1962 | Pelzer | 198/369 X |
| 3,107,795 | 10/1963 | Young et al. | 214/14 |
| 3,198,353 | 8/1965 | McDowell | 214/14 |
| 3,401,786 | 9/1968 | D'Agati | 198/369 |
| 3,486,641 | 12/1969 | Zweifel et al. | 214/14 |

Primary Examiner—Frank E. Werner
Attorney, Agent, or Firm—Carella, Bain, Gilfillan & Rhodes

[57] ABSTRACT

A pocket dock ship loader is disclosed to include at least one pocket to accommodate dock site storage of bulk material, a first conveyor such as a tripper conveyor for transporting bulk material from an off-dock source to the pocket, a second conveyor such as a shuttle conveyor for transporting the bulk material from the pocket to a drop point above the cargo hatch of a vessel and means for regulating the flow of bulk material from the pocket to the shuttle conveyor, wherein the shuttle conveyor is extensible and retractable between a stowed position and an operating position. The ship loader also incorporates a purge conveyor structure for removing material from the material pockets in anticipation of the loading of different materials on a next subsequent vessel.

4 Claims, 8 Drawing Figures

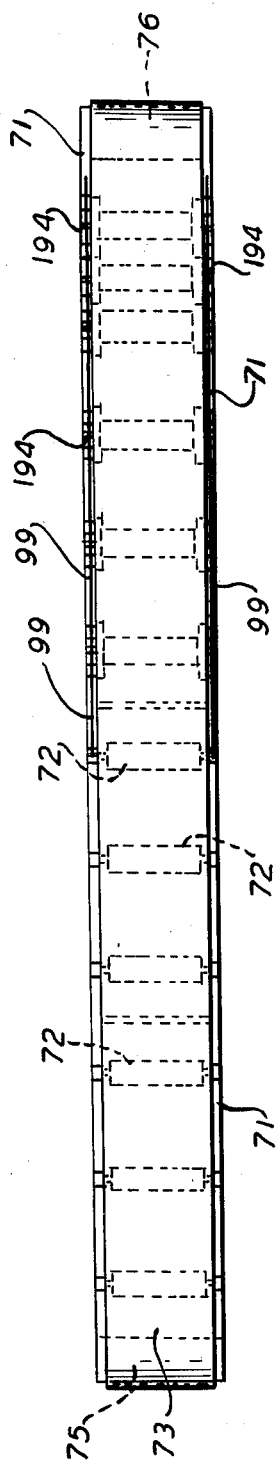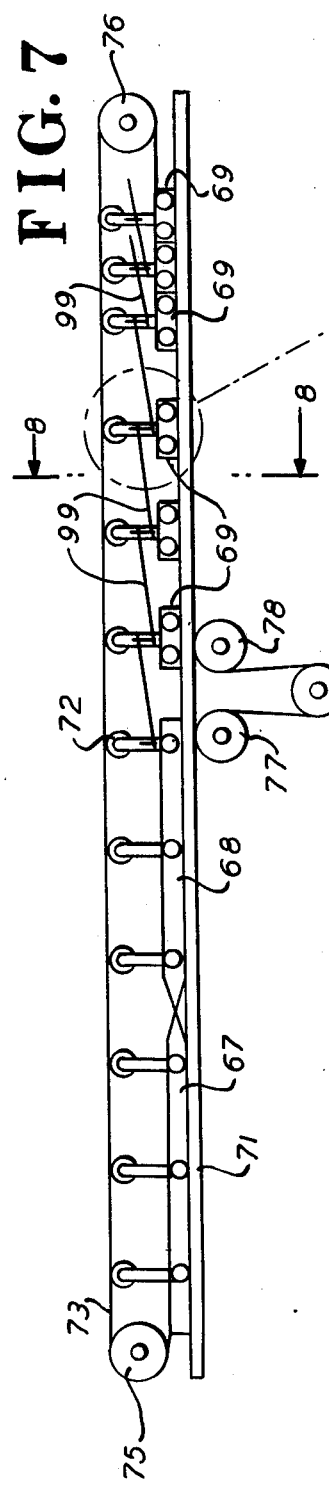

POCKET DOOR SHIP LOADER

BACKGROUND OF THE INVENTION

This invention relates to vessel loading apparatus. In particular, this invention relates to a vessel loading apparatus specifically designed to be utilized in combination with portions of existing vessel loading structures known as "pocket docks" to permit utilization of such pocket docks to load vessels of such increased length, beam and hatch height as are presently being used and are proposed to be used for purposes of transporting bulk materials.

"pockets docks" are docks which have long been in use on the Great Lakes for purposes of loading bulk materials. They have been recognized as the most efficient means of loading bulk materials such as coal and iron ore into bulk carriers for water transportation to destinations such as power plants and steel plants.

The first of such docks were built in the early Twentieth Century. However, even today, they are considered to be a fast and efficient means to load vessels of older classes as used on the Great Lakes, which vessels have a beam of 75 feet or less.

Pockets docks are presently in use at approximately 12 facilities and operate in the handling of millions of tons of bulk materials per year.

A typical pocket dock of known design consists of multiple double storage bins or pockets spaced at 12 feet intervals along a finger pier of such length as to accommodate one or more vessels on either side of the pier. The pockets (i.e. the bins) receive material by gravity from bottom dump railroad cars positioned by locomotives over the pocket tops. During the vessel loading operation, material is discharged by gravity from the pocket into the vessel through gates and loading chutes or spouts located at the bottom of each pocket. Each spout is hinged at the bottom of the pocket to permit it to be raised to a non-operating position clear of the dock line or lowered into the hatch opening of the vessel being loaded at such an angle as to permit material to flow freely, by gravity, from the pocket into the cargo hold.

Most of the existent pocket docks have sufficient storage capacity of material in the pockets to permit loading the older class of vessel without filling the pockets during the loading operation.

Notwithstanding the demonstrated efficiency of the pocket docks, they are not structurally capable of handling the new, larger vessels presently being utilized or proposed to be utilized for carrying bulk material. Thus, with the arrival of such new super bulk carrier vessels, other means of loading such vessels economically have been under consideration.

The magnitude of the problem is best reflected with consideration for the size of the vessels being served.

The new vessel class has a beam of 105 feet and future vessels are contemplated with beams of up to 130 feet. In addition to the increased width, these vessels are of a deeper draft and obviously have cargo carrying capacities which are greatly in excess of the capacities of vessels previously loaded at the pocket docks and for which the pocket docks were designed. The increased beams, drafts and carrying capacities of the new classes of vessels preclude efficient loading from the facilities provided at the existing pocket docks. Loading spouts used with such pocket docks operate on a gravity principle and therefore must be lowered to an angle sufficiently steep to permit adequate flow of material being loaded. Such a pitch requirement renders them incapable of providing adequate reach away from the dock face to load larger beam vessels. Further, the vessels which have a greater draft when loaded have a higher free board when unloaded and as such the increased free board presented by the newer classes of vessels may be such as to preclude a satisfactory angle of inclination on the loading spout to permit a flow of material. This, of course, incapacitates the dock.

It has also been recognized that the capacity of the new classes of vessels is normally greater than the combined capacity of the pockets in the existing docks. In order to overcome this difficulty and still use the presently existing facilities, it has been known to load one side of a large vessel first on one side of the pocket dock and thereafter to move the vessel to another dock to load the other side. Clearly this is time consuming and an inefficient and expensive operation.

Prior to the present invention, it was generally accepted in the industry that the only way to accommodate new vessels at existing pocket dock facilities was to demolish the existing pocket docks and replace them with travelling shiploaders. This approach was undesirable because the existing pocket docks are in excellent condition, their structure is more than adequate to support loads presented by the volumes and masses of the new bulk material and by reason of their excellent structural condition, their demolition would be an extremely expensive project. The present invention rejected the idea that demolition of the existing docks was required and resulted from a desire by the inventors to utilize, to the extent possible, the existing pocket dock facilities while at the same time providing a capability for handling the bulk materials required to load the newly proposed classes of vessels in an efficient period of time.

It is acknowledged that an approach to the utilization of the existing pocket dock facilities has been sought. Various schemes were proposed to achieve this end, all without success. Included in these schemes were: a travelling device mounted on the water side of the pocket section of the dock to receive material from the bottom of the pocket and thereafter convey it into the vessel; a portable vehicle equipped with a conveyor to ride on the deck of the vessel and transfer material from the loading spouts of the pocket dock to the vessel hatch openings or other ancillary conveyor arrangements; and portable or fixed conveyor devices installed on the vessel to transfer material deposited by the loading spouts to the vessel hold. None of these proved either structurally or financially feasible.

SUMMARY OF THE INVENTION

It is the object of the present invention, therefore, to provide structure for accomplishing modification of existing pocket docks to permit loading of bulk materials into bulk material carrying vessels at an economical rate and with a minimum of expenditure for modification of the existing pocket dock structure.

An additional object of the present invention is to provide modification to existing pocket dock facilities to increase the storage capacity of the dock.

A still further object of the present invention is to provide an existing pocket dock facility with a more rapid means of filling the pockets with material to be loaded in a vessel.

Yet another object of the present invention is to provide modification structure to existing pocket docks whereby the pocket dock stowage facilities may be utilized to load cargo carrying vessels of a higher free board and broader beam than those previously servicable from pocket docks.

Yet an additional object of the present invention is to provide a pocket dock facility with a material purge capability whereby to purge one type of bulk material from the pockets, store the bulk material and prepare the pockets for handling of another type of material.

These objects and others not enumerated are achieved by the pocket dock ship loader according to the present invention, one embodiment of which may include at least one pocket to accommodate dock side storage of bulk material, a first conveyor means for transporting bulk material from an off-dock source to the pocket, a second conveyor means for transporting bulk material from the pocket to a drop point above the cargo hatch of a bulk material carrying vessel and a means for regulating the flow of bulk material from the pocket to the second conveyor means, the second conveyor means being retractable to a stowed position generally under the pocket and extendible into an operational position between the pocket discharge and the drop point for the material.

BRIEF DESCRIPTION OF THE DRAWINGS

A more complete understanding of the present invention may be had from the following detailed description thereof, particularly when considered in the light of the accompanying drawings wherein:

FIG. 6 is a schematic plane view of a shuttle conveyor as used in conjunction with the invention;

FIG. 7 is a side elevational schematic view of the shuttle conveyor of FIG. 6;

FIG. 8 is a schematic elevational view through the plane 8—8 of FIG. 7.

DETAILED DESCRIPTION

Figure 1:
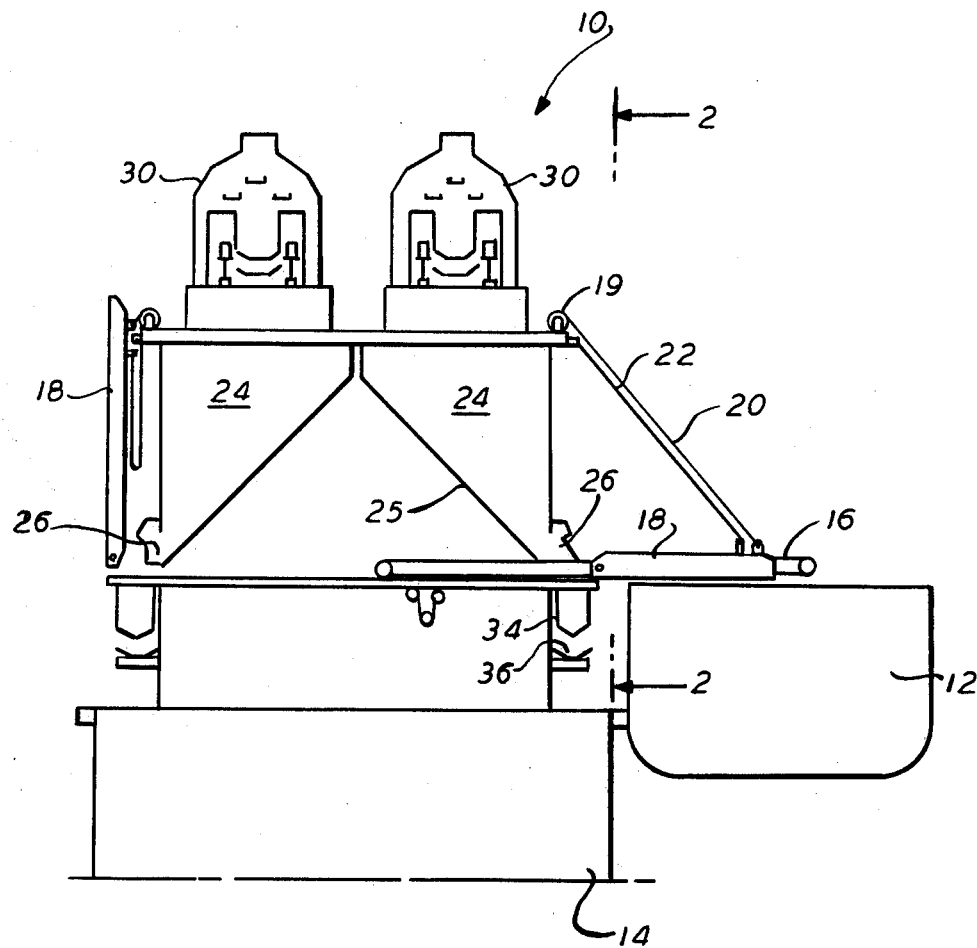
FIG. 1 is a schematic elevational view of a pocket dock modified in accordance with the structure of the present invention.

Considering therefore the drawings and with particular reference to FIG. 1, there is shown a pocket dock modified in accordance with the present invention and designated generally by reference numeral 10. The pocket dock facility is shown to be mounted on a finger pier 14 and includes a pocket dock structure for both the port and starboard sides of the pier.

Detailed description of pocket dock structure according to the invention is done with respect to the pocket dock servicing the starboard side of the pier as seen in FIG. 1 it being recognized that the dock facility structure with respect to the port side of the pier is identical but opposite hand to the structure shown in FIG. 1.

Thus, it can be seen that there is moored adjacent the starboard side of the pier 14 a vessel of the type utilized to carry bulk materials, and in particular a vessel of the type generally known in the Great Lakes to carry bulk materials. Vessel 12 is being loaded with bulk material by the use of a shuttle conveyor 16 which extends outwardly from the face of the dock structure within an apron 18 which is lowered into operating position by an apron hoist 19 which is operationally connected to apron 18 through apron hoist cable 20. The position of apron 18 when not in use is shown with reference to the port side dock facility where it can be seen that the apron has been hoisted from the horizontal position shown on the starboard side to the vertical position shown on the port side. It should also be noted that there is provided by reason of safety a safety cable 22 secured between the upper dock face and the apron to preclude damage resulting e.g. from loss of power in the apron hoist.

The basic portion of the dock providing for stowage of material is the bin or pocket 24 from which the dock has derived its name. In this regard the structure of the bin or pocket other than possible modification for increased volume by vertical extension of the dock structure is not contemplated to be modified with respect to the structure of the present invention. In this regard it is the purpose of the present invention to retain as much of existing pocket dock structure as possible while at the same time providing structural operational modifications to permit handling of the larger size vessels presently in use or contemplated for use for bulk materials handling.

Thus it can be seen that pocket 24 is a bin type structure having a sloping side 25 to accommodate gravity feed of materials toward a discharge orifice 26. As is discussed below in detail, discharge orifice 26 is provided with flow regulating means to control the rate of deposit of material passing from bin 24 onto shuttle conveyor 16 for loading into the cargo holds of ship 12. Mounted on the upper structure of dock 10 are trippers 30 which are used in conjunction with tripper conveyors to provide material from an off dock stowage area to the pockets of the dock structure. As is discussed below in detail, each assembly comprises travelling trippers in tandem with adjustable splitter devices to provide for efficient deposit of bulk material in desired pockets for loading onto the vessels.

Disposed generally under discharge orifice 26 is a chute 34 which opens onto a purge conveyor 36. The function of chute 34 and purge conveyor 36 is to permit purging of the pockets of the particular pocket dock of one type of material when it becomes necessary to utilize the dock for loading a second and different type of material onto a subsequent ship. The purge conveyor carries material from the discharge opening of the dock pockets to an off dock storage where the material can be stored until ready for loading onto a subsequently arriving vessel.

Figure 2:
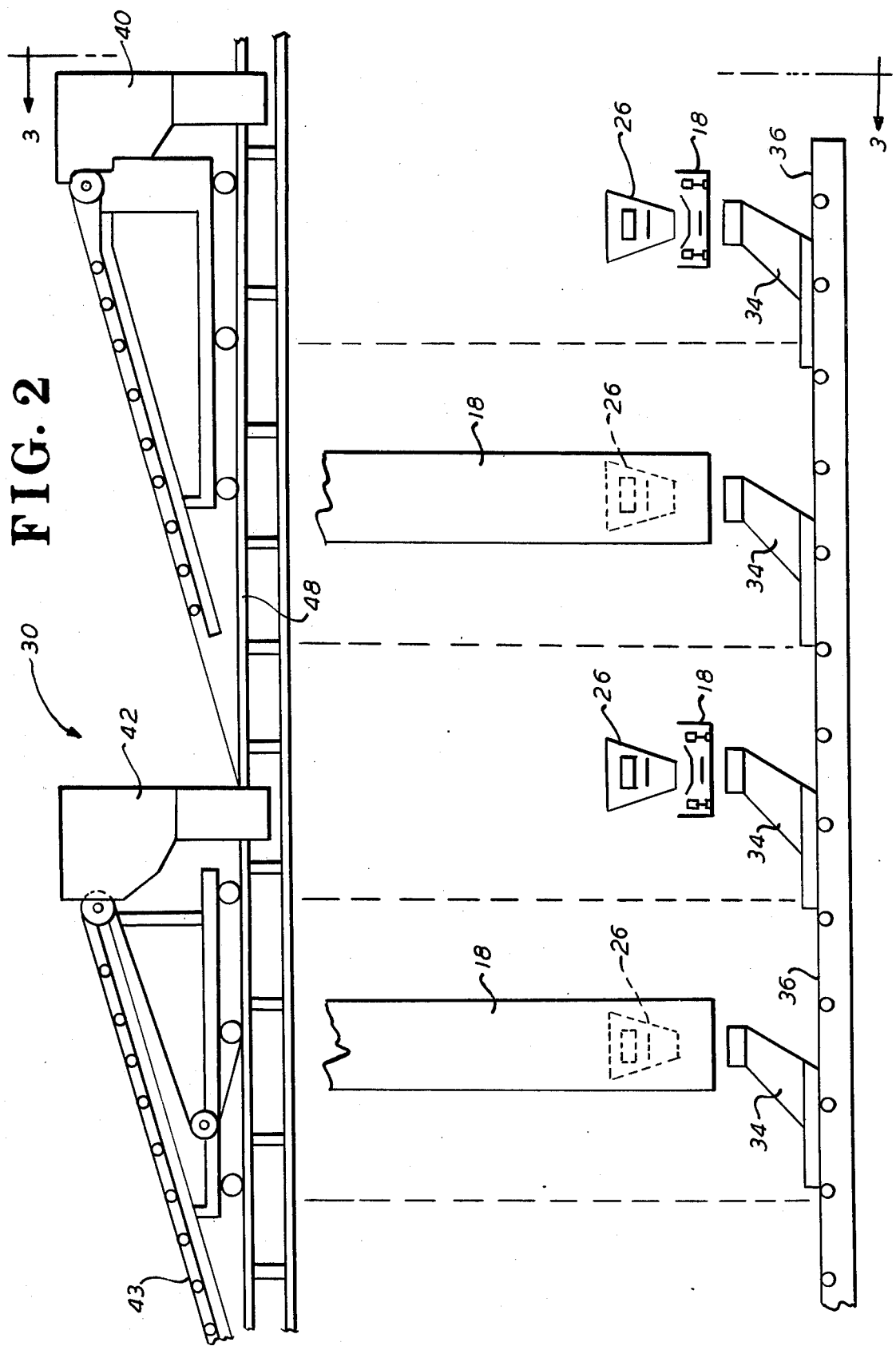
FIG. 2 is a schematic elevational view through the plane 2—2 of FIG. 1.

The tandem operation of the trippers and tripper conveyor best may be seen with respect to FIG. 2. Thus in FIG. 2 the tripper assembly 30 is shown to include an outboard tripper 40 and an inboard tripper 42. Material from an off-dock storage area is delivered to the dock on tripper conveyor 43 which passes outwardly along the dock and upwardly into inboard tripper 42 wherein it is dropped, split (see FIG. 4 and discussion with respect thereto) with a portion of the material being dropped into the pocket of the dock below inboard tripper 42 and the remainder of the material being redeposited upon tripper conveyor 43 for carriage outwardly to outboard tripper 40. At outboard tripper 40 the material is dropped from the conveyor and into the pocket under the outboard tripper. Thus it can be seen that by selectively positioning the inboard and outboard trippers, the pockets into which material is being delivered from the off dock storage area may be selectively chosen and more than a single pocket may be served at the same time. It should also be noted, as is discussed in detail below, that the amounts of materials being deposited in pockets being served by the respective trippers may be varied by operation of a splitter mechanism contained within inboard tripper 42.

Also shown in FIG. 2 is the dock face and in particular two aprons 18 shown in the upright or stowed position and two aprons 18 shown in the generally horizontal or operational position. The aprons are shown with respect to the discharge openings 26 of the various pockets and there is also shown the purge chute 34 and purge conveyor 36 thereunder.

It should be noted at the outset that the drive means utilized for all conveyors and the basic support structure for the conveyors, unless indicated otherwise, is equipment which is known to those having skill in these arts and generally available. Similarly, tripper structure, its support structure and operating means, other than as specifically disclosed in detail, is structure which is generally known in these arts and within the ken of one having ordinary skill in these arts.

Trippers 40 and 42 are mounted by wheels on track 48 which is supported by the basic structure of the pocket dock 10. Tripper conveyor 43 may be selected from any of the conveyor structures which are known for use in conjunction with trippers by those having skill in these arts.

Similarly, purge conveyor 36 is a conveyor which, although new in terms of incorporation with pocket dock structure and for the purpose intended in conjunction with the overall ship-loading system of the present invention, is a conveyor the specific structure of which may be chosen from any of the many which are generally known in these arts.

Figure 3:
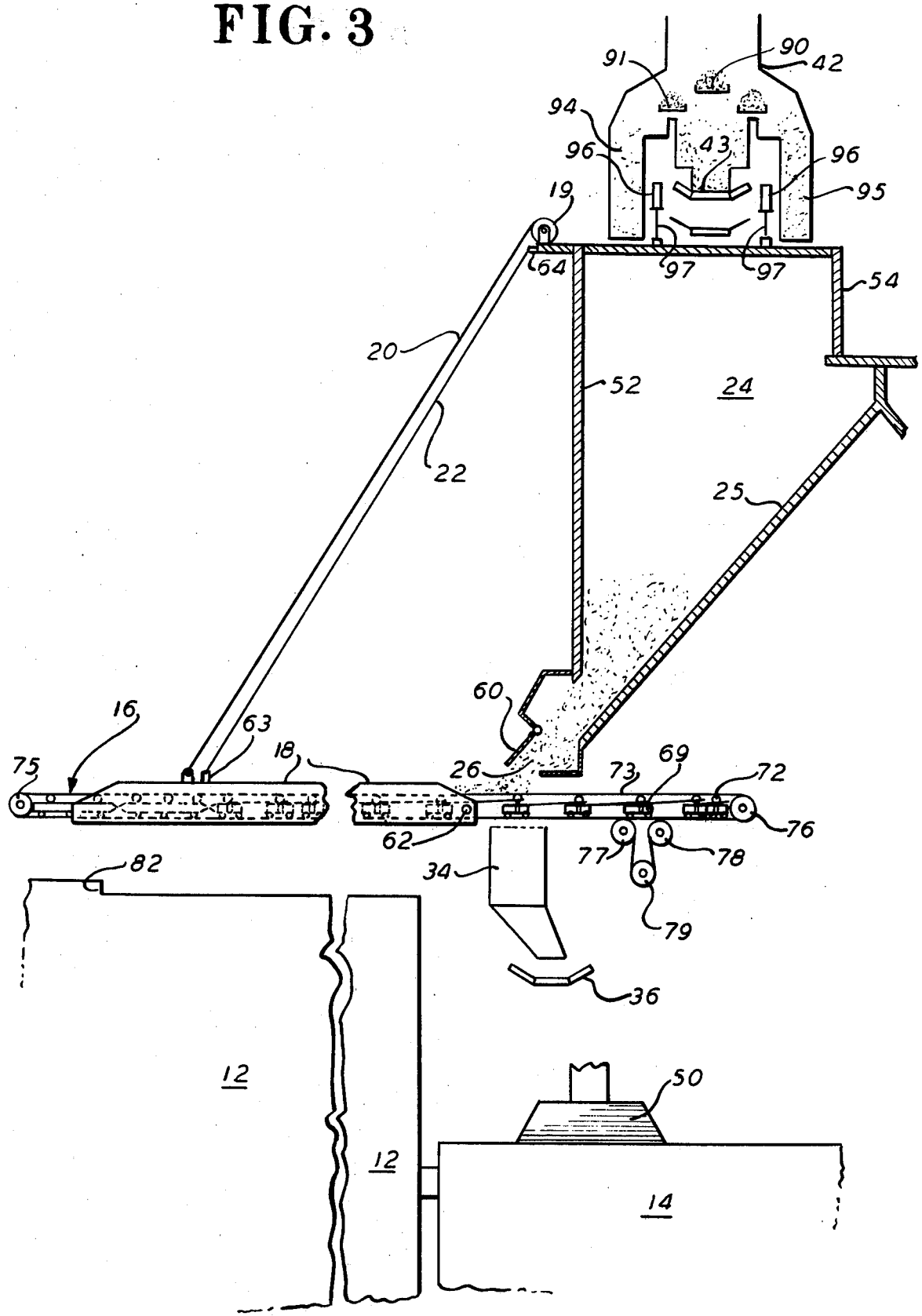
FIG. 3 is a schematic elevational view through the plane 3—3 of FIG. 2 showing additionally portions of the dock, ship and extended shuttle conveyor.
Figure 4:
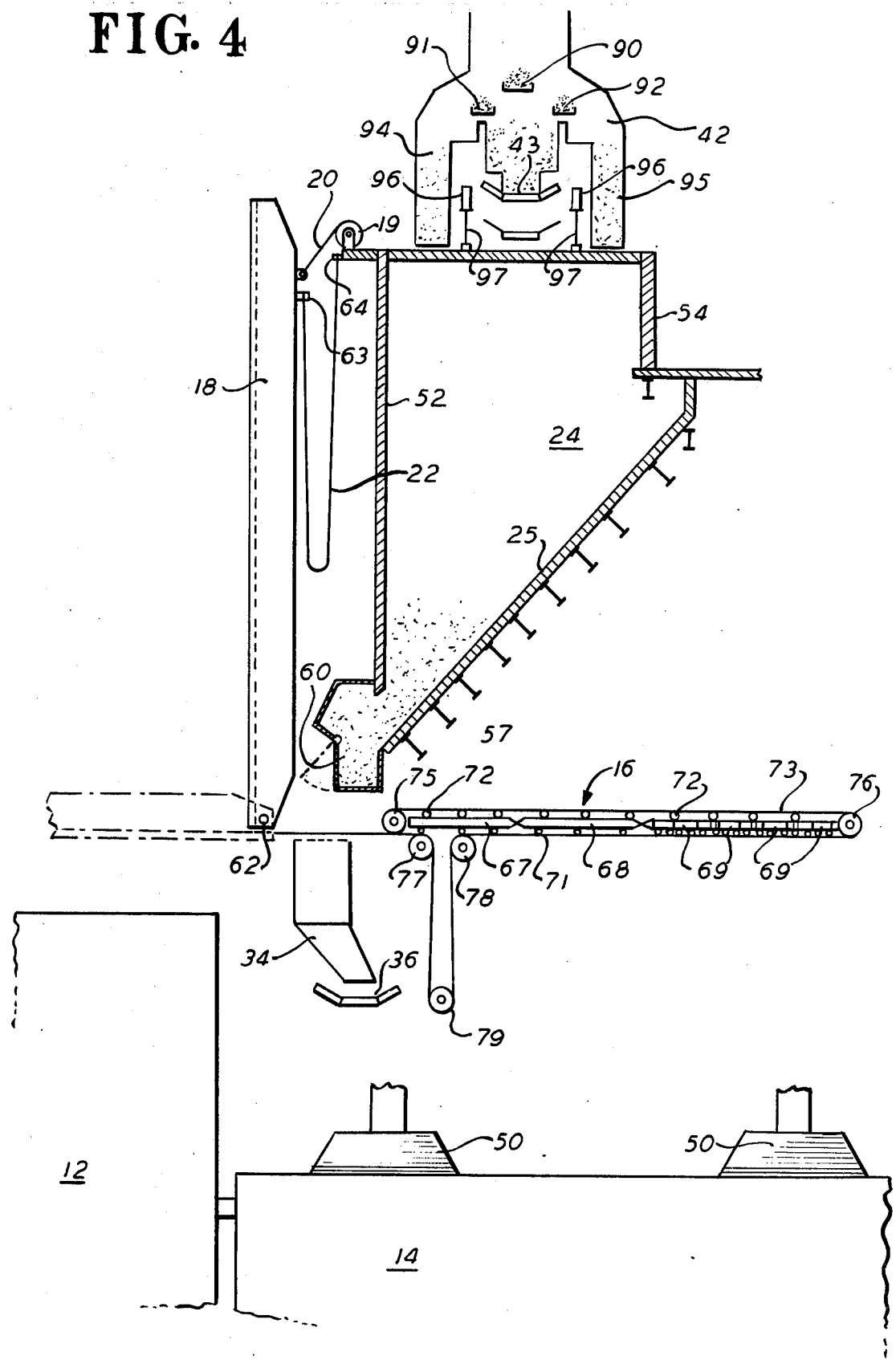
FIG. 4 is a view similar to FIG. 3 but showing the apron and shuttle conveyor in a stowed position.
Figure 5:
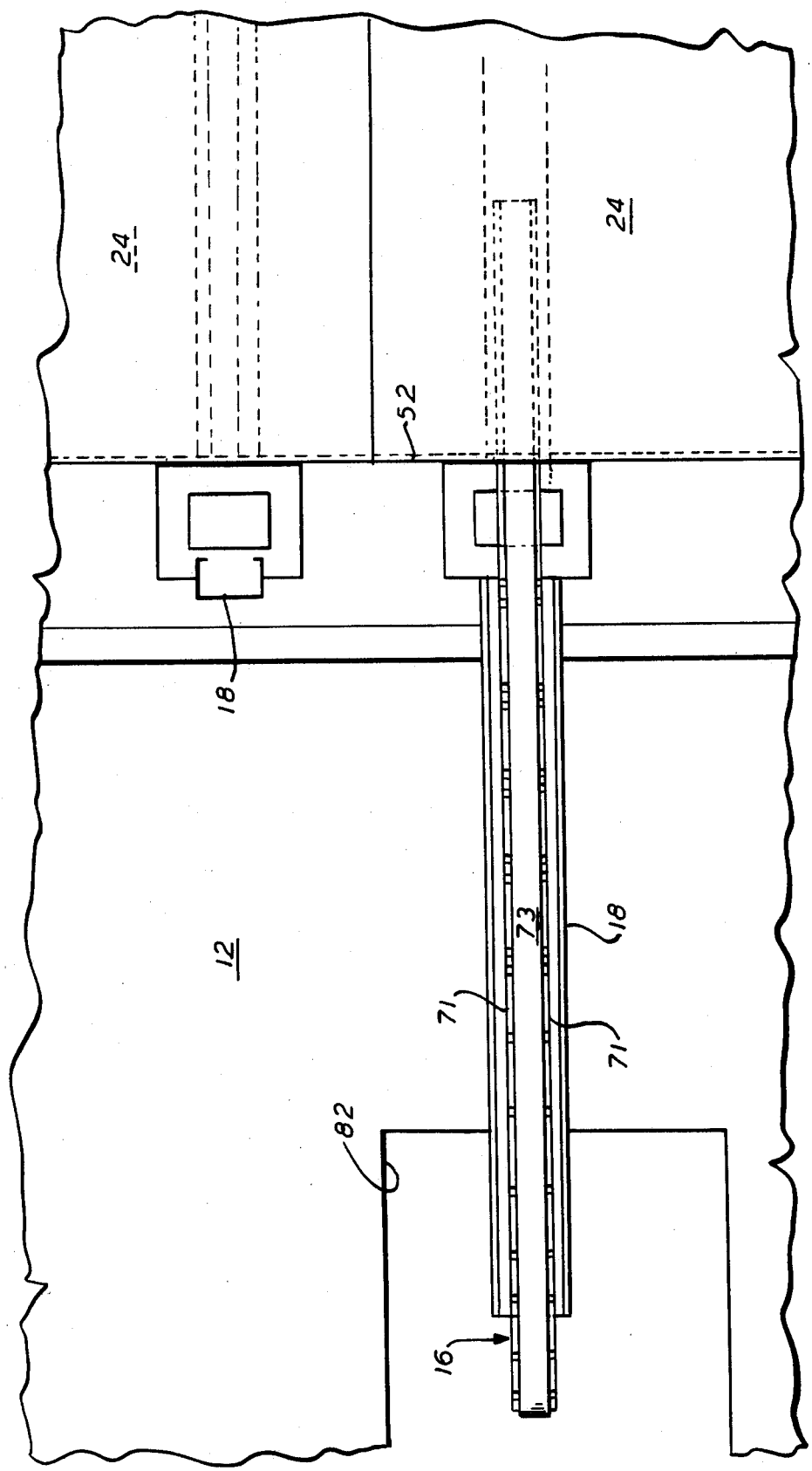
FIG. 5 is a partial schematic plan view of pocket dock structure in accordance with the invention showing the shuttle conveyor in the operational position and the apron in the stowed position.

Considering now FIGS. 3 and 4 and the cooperation of the respective conveyor assemblies in aprons and other structure which, when combined, comprise the modified pocket dock ship-loading facility according to the invention, there is shown by way of orientation pier 14, ship 12, inboard tripper 42 and pocket 24.

There is also shown mounted on the upper level of pier 14 a pair of structural pedestals 50 which for purposes of the present invention are existing structural supports for the pocket docks and which are therefore shown only partially to indicate that the dock and ship loading structure is supported from the surface of the pier by appropriate structural means presently existing.

Pocket 24 can be seen to comprise a dock face wall 52, a back wall 54 and an inclined wall 25. The present invention contemplates that these structural elements are existing in the present pocket and as will be recognized by those skilled in these arts, the forward and after ends of the pocket 24 are closed by appropriate structural partitions. The lower end of dock face wall 52 and inclined wall 25 cooperate to define an opening 26 through which material is permitted to pass out of pocket 24 through a regulating gate 60, which is pivoted at its upper end and the opening of which is controlled to regulate the gravity flow of material out of pocket 24.

Pivotally mounted outboard of dock face wall 52 is apron 18. Apron 18 is a generally U-shaped member which may be provided with lightening holes (not shown) and which is supported at one end by a pivot hinge 62 to permit rotation thereabout from a generally vertically extending position (FIG. 4) to a generally horizontal operating position (FIG. 3). Apron 18 is rotated about pivot 62 between stowed and operating positions through the use of apron hoist 19 which pays out or hauls in apron hoist cable 20. Rotational movement of apron 18 is limited for safety purposes, i.e. in the event of failure of apron hoist 19, by the provision of safety cable 22 one end of which is secured to a pad 63 mounted on apron 18 and the other end of which is secured to a pad 64 mounted on the structure of pocket dock 10. Rigidly mounted within apron 18 are a pair of tracks which accommodate thereon shuttle conveyor 16.

More specifically, and with initial reference to FIG. 4, there is shown in the stowed position a shuttle conveyor designated generally by the reference numeral 16. Shuttle conveyor 16 comprises a first fixed length shuttle support 67, a second fixed length shuttle support 68 and a plurality of loose-link nesting shuttle supports 69. The specific structure in cooperation of the shuttle supports is discussed hereinbelow in greater detail with reference to FIGS. 6–8.

Mounted on the structure of pocket dock 10 and in horizontal alignment with the tracks of apron 18 are a pair of tracks 71. The various support elements of shuttle conveyor 16 are movably mounted on track 71 between the stowed position shown in FIG. 4 and the operational position shown in FIG. 3. Supported by shuttle supports are a plurality of rollers 72 which are typical conveyor support rollers and which support shuttle conveyor belt 73. Shuttle conveyor belt 73 passes around end pulleys 75 and 76 as well as over fixed pulleys 77 and 78 and finally downwardly around take-up pulley 79. Thus, it can be seen that as shuttle conveyor 16 expands in length from the length experienced in the stowed position (FIG. 4) to the greater length shown in operational position (FIG. 3), the additional length of conveyor belt thus required is provided by the shortening of the distance between the conveyor and take-up pulley 79. Thus, pulley 79 raises as the length of shuttle conveyor 16 increases and lowers as the length of shuttle conveyor 16 decreases.

In operation, when a ship comes alongside pier 14, apron 18 is maintained in the stowed position so as to not interfere with the ship's rigging or with other operation of the vessel.

Once the ship is tied up and ready to receive cargo, apron hoist 19 is operated to lower apron 18 from the position as shown in FIG. 4 to the generally horizontal position shown in FIG. 3. Thereafter, shuttle conveyor 16 is hauled outwardly, generally perpendicularly to the dock face such as to position pulley 75 and thus the drop point from the conveyor at a point above the open cargo hatch 82 of vessel 12. Outhaul of the shuttle conveyor 16 is achieved by any standard outhaul apparatus known generally in the art and no specific outhaul capability is shown. It should be noted, however, that the transverse positioning of the drop point is achieved by manipulating the outhaul mechanism to adjust the position of pulley 75 with respect to the cargo hatch opening. Thus, transverse adjustment of the drop point is possible. It is further noted that within the generally accepted operational limits of conveyors, the position of the drop point may be vertically adjusted by manipulation of apron hoist 19 to raise or lower the apron and therewith the shuttle conveyor while the conveyor is generally in the operating position.

Thus, in anticipation of the arrival of a vessel to be loaded, pocket 24 may be filled to capacity. Upon the positioning of apron 18 and shuttle conveyor 16 in the desired configuration for loading, i.e. as shown in FIG. 3, regulating gate 60 is opened by an amount sufficient to permit passage of a desired amount of bulk material onto shuttle conveyor belt 73. The conveyor is operated to cause the material to be carried to the end of conveyor 16 and thereafter dropped into the cargo hold of vessel 12.

On completion of the loading evolution, the outhaul apparatus is operated to withdraw shuttle conveyor 16 from the operational position of FIG. 3 to the stowed position of FIG. 4 whereupon apron 18 may be hoisted from the generally horizontal operating position of FIG. 3 to the generally vertical stowed position shown in FIG. 4.

It will be recognized by those skilled in these arts that the volumetric capacity of the existing pockets, even as modified by vertical expansion, is not sufficient to provide a full load of bulk material to the presently contemplated bulk material handling vessels and as such material is provided, even during loading, through the operation of trippers 40 and 42.

In this regard, with reference to FIG. 4, the operation of splitter tripper 42 may be briefly described. Thus, splitter conveyor 43 (FIG. 2) deposits bulk material in the upper portion of splitter tripper 42. The material falls on material previously collected in a plurality of barrier trays 90, 91 and 92. Because of the positioning of trays 90, 91 and 92 material is split, a portion passing outwardly through passages 94 and 95 of the tripper and a poriton passing centrally downwardly onto conveyor belt 43 which thereafter causes the material to be carried outboard on the pier to outboard tripper 40. As is evident from FIGS. 3 and 4, the trippers are mounted by wheels 96 on rails 97 which define track 48 thereby permitting adjustment of the location of the trippers along the pier to accommodate selective filling of pockets. In this regard, presently existing pier units have docks servicing individual ships with pockets spaced on 12 foot center lines. Further, barrier trays 91 and 92 are transversely adjustable to proportion the amount of material being dropped by trippers 40 and 42.

Disposed vertically below the opening from pocket 24 and the opening defined by regulating gate 60 is purge chute 34 which collects materials and deposits them onto purge conveyor 36. Thus, upon the completion of the loading of a ship with one material, it may be desired or necessary to load a next subsequent ship with a different material. In order to do this without contaminating the subsequent load, residual material from the first loading operation must be removed from the pockets. In order to do this without losing the material, shuttle conveyors 16 are placed in a stowed position, regulating gates 60 are opened and material is permitted to pass from the pocket outwardly through openings 26 and the opening of regulating gate 60 and thereafter downwardly through chute 34 onto purge conveyor 36 for removal from the dock area into an off dock storage area. Upon the completion of the removal of material, the pocket docks are then ready for handling of a different material without unacceptable contamination.

It can be seen therefore that the broad concept of the present invention contemplates providing existing pocket dock structure with three basic conveyor means, i.e. a tripper conveyor for transporting materials from an off dock storage to pockets in anticipation of the loading of a vessel, a shuttle conveyor for transporting material from the pocket stowage to a drop point above the open cargo hatch of a vessel to be loaded and a purge conveyor for accommodating purging of the pocket stowage system in anticipation of the loading of a next subsequent vessel with a separate material. These structural modifications of the docking facility cooperate to permit the existing docking facilities to be, for the most part, retained. Such retention of the existing facilities, particularly the pier facilities which require no modification and the basic structural facilities which are more than adequate to support the modified structure permits upgrading of the pocket dock facilities to permit handling of the larger class vessels presently in use or contemplated for use on the Great Lakes, which upgrading is achieved relatively inexpensively, with a minimum of construction difficulty and in particular a minimum of construction in the body of water with the attendant environmental difficulties and in a minimum of time.

One of the keys to the modification of the dock in the manner shown is the provision of the shuttle conveyor which is expansible and retractable between stowed and operating positions. This expansible and retractable capability is achieved by the provision of nestable sections as shuttle supports. Thus, as was discussed above with respect to FIG. 4, the shuttle supports are seen to include fixed length shuttle supports 67 and 68 together with a plurality of nestable shuttle support sections 69. Each of the shuttle supports is provided with wheels which ride on tracks 71 which tracks are defined by a first section mounted on the dock structure and a second section mounted on apron 18. The second fixed length shuttle support section and each of the nestable shuttle support sections is provided with a vertically extending pad 194 in which are formed a lower first throughbore 192 and an upper throughbore 193 (FIG. 8). Extending between fixed length shuttle conveyor section 68 and nestable shuttle sections 69 are connector links 99. Each connector link is fixed at its outboard end, i.e. the left side as seen in FIG. 7, within lower bore 192. This may be achieved by providing the ends of connector links 99 with threaded portions and, in the case of the outboard end, threading two nuts, thereon one to be positioned on the inboard side of pad 194 and one on the outboard side of pad 194 such as to rigidly secure connector link 99 at its outboard end to pad 194. The opposite end of each connector link 99 is passed slidably through upper bore 193 whereupon a nut may be provided on the threaded end of connector link 99. With the connector links so structured, they are thus slidably received within bores 193 of the nestable supports inboard and next adjacent but rigidly secured to the nestable supports on their outboard end. Thus, displacement of the outboard end, i.e. support sections 67 and 68, outwardly by the operation of the outhaul means discussed above causes connector links 99 to move outwardly. Upon such movement, the first slidable connector link 99 commences to move outwardly and does so sliding through upper bore 193 until its inboard nut comes into engagement with pad 194 whereupon the next nestable support commences to move outwardly. This process is repeated until the shuttle conveyor is fully extended. It should also be noted that during extension take-up pulley 79 moves vertically upwardly to thus shorten the amount of conveyor material in the take-up loop and increase the amount of material in the actual conveyor length.

Upon completion of a loading operation, shuttle conveyor 16 is retracted by the retraction of outboard supports 67 and 68, whereupon retraction of the outboard supports causes progressive nesting of the nestable supports 69. Thus, the reverse operation from that described above with respect to the elongation of shuttle conveyor 16 is achieved and the conveyor returns to the stowed position as shown in FIG. 4.

As will be recognized by those skilled in these arts, the improvements thus provided by the structural proposals described above include an increased storage capacity of the pocket dock, the replacement of gravity flow gates and chutes with flow controlled gates and positive displacement conveyors for transporting bulk material to the drop point above the cargo hatch, and the incorporation of means for purging the system in anticipation of a next and different use.

The use of the shuttle conveyor permits accommodation of ships of higher free board and wider beam.

It will be recognized by those skilled in these arts that various modifications and changes can be made to the preferred embodiment of the invention as disclosed herein without departing from the spirit and the scope thereof.

What is claimed is:

1. A pocket dock ship loader of the type wherein bulk materials are transported from an off dock storage to a dock storage site in preparation for loading of a vessel and wherein the bulk materials may be loaded on such vessel at a speed such as to minimize the demurrage time of such vessel, comprising:
   a. at least one pocket constructed on a dock, said pocket to accommodate dock side storage of bulk material;
   b. first conveyor means for transporting bulk material from an off-dock source to said pocket;
   c. an apron, said apron extending perpendicular to the face of said dock and being positionable in a generally horizontal operating position and a generally vertical stowed position;
   d. a first track section mounted on said dock under said at least one pocket;
   e. a second track section mounted on said apron, said second track section being aligned and coplanar with said first track section when said apron is in said generally horizontal operating position;
   f. second conveyor means for transporting said bulk material from said pocket to a drop point above the cargo hatch of a bulk material carrying vessel, said second conveyor means being extensible from a stowed position, in which it is entirely supported by said first track section, to an operating position in which it is supported by both said first and said second track sections; and
   g. means, mounted on said at least one pocket above said second conveyor means, for regulating the flow of bulk material from said at least one pocket to said second conveyor means.

2. A pocket dock ship loader as claimed in claim 1 wherein said second conveyor is extensible from said stowed position selectively along said second track means and beyond the end of said apron, said extensibility of said second conveyor means for accommodating the drop of said bulk material at selectively displaced drop points above the cargo hatch of a bulk material carrying vessel.

3. A pocket dock ship loader as claimed in claim 2 including a third conveyor means, said third conveyor means defining a purge conveyor for transporting not loaded bulk material from said at least one pocket to an off-dock storage.

4. A pocket dock ship loader as claimed in claim 2 wherein said second conveyor includes at least one support section and a plurality of nestable supports, said at least one support section being disposed at the discharge end of said second conveyor.

* * * * *